United States Patent

Saval et al.

[11] Patent Number: 5,325,003
[45] Date of Patent: Jun. 28, 1994

[54] MOLDED ROTOR ASSEMBLY FOR AN ALTERNATOR AND METHOD FOR MAKING THE SAME

[75] Inventors: Joseph E. Saval, Romulus; Steven J. Yockey, Farmington Hills; Gregory A. Ritchie, Ypsilanti; Eric D. Bramson, Ann Arbor, all of Mich.

[73] Assignee: Ford Motor Company, Dearborn, Mich.

[21] Appl. No.: 980,391

[22] Filed: Nov. 23, 1992

[51] Int. Cl.[5] .................................. H02K 13/02
[52] U.S. Cl. ...................................... 310/43; 310/71; 310/235; 310/263; 310/232
[58] Field of Search ............... 310/42, 43, 71, 232, 310/234, 235, 263

[56] References Cited

U.S. PATENT DOCUMENTS

| 4,406,961 | 9/1983 | Pflüger et al. | 310/232 |
| 4,419,597 | 12/1983 | Shiga et al. | 310/68 D |
| 4,617,485 | 10/1986 | Nakamura et al. | 310/65 |
| 4,618,793 | 10/1986 | Shizuka et al. | 310/232 |

FOREIGN PATENT DOCUMENTS 62-189928 8/1987 Japan.

*Primary Examiner*—R. Skudy
*Assistant Examiner*—D. R. Haszko
*Attorney, Agent, or Firm*—Roger L. May; Paul K. Godwin, Jr.

[57] ABSTRACT

A molded rotor assembly (20) for a vehicle alternator and method for making the same are disclosed. The rotor assembly includes first and second pole pieces (24,26) aligned along a longitudinal axis (40), the pair of pole pieces (24,26) defining a region therebetween. A coil wire (46) is located in the region. The pole pieces (24,26) and a slip ring assembly (36) are mounted on a rotor shaft (38). The slip ring assembly (36) has a pair of slip rings (102,104) connected to a pair of terminals (96,98) which are attached to respective free ends of the coil wire (46) to form a pair of connections (126,128). A molded insert (22) is injection molded filling the region between the pole pieces (24,26) thereby encapsulating the connections (126,128) and the coil wire (96) and forming a smooth cylindrical periphery on the rotor assembly (20).

19 Claims, 7 Drawing Sheets

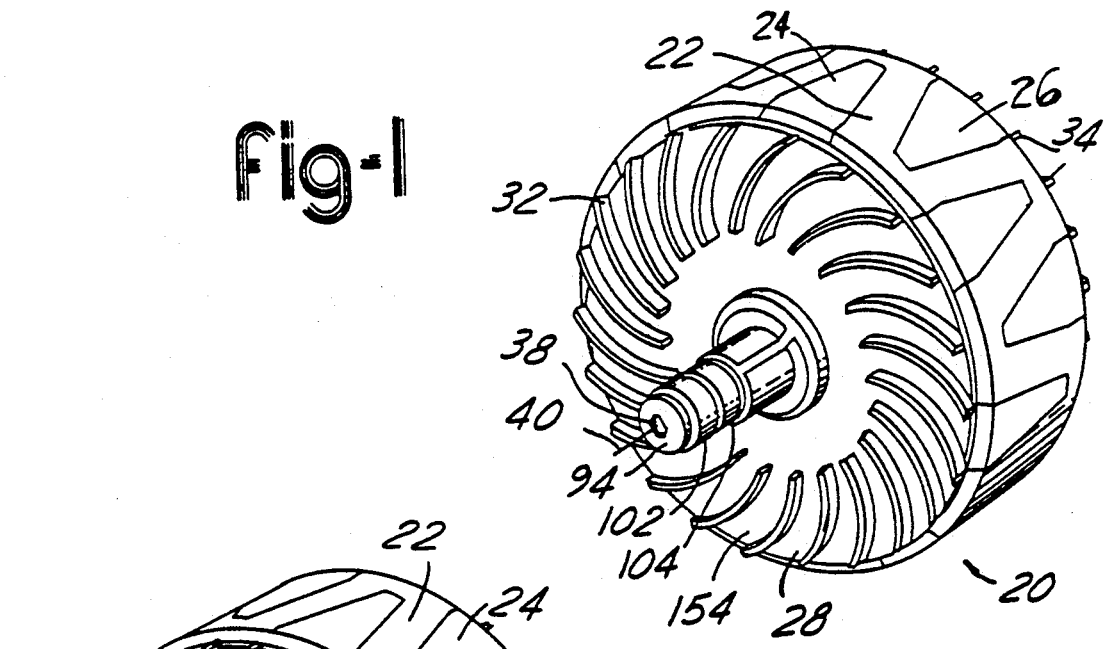
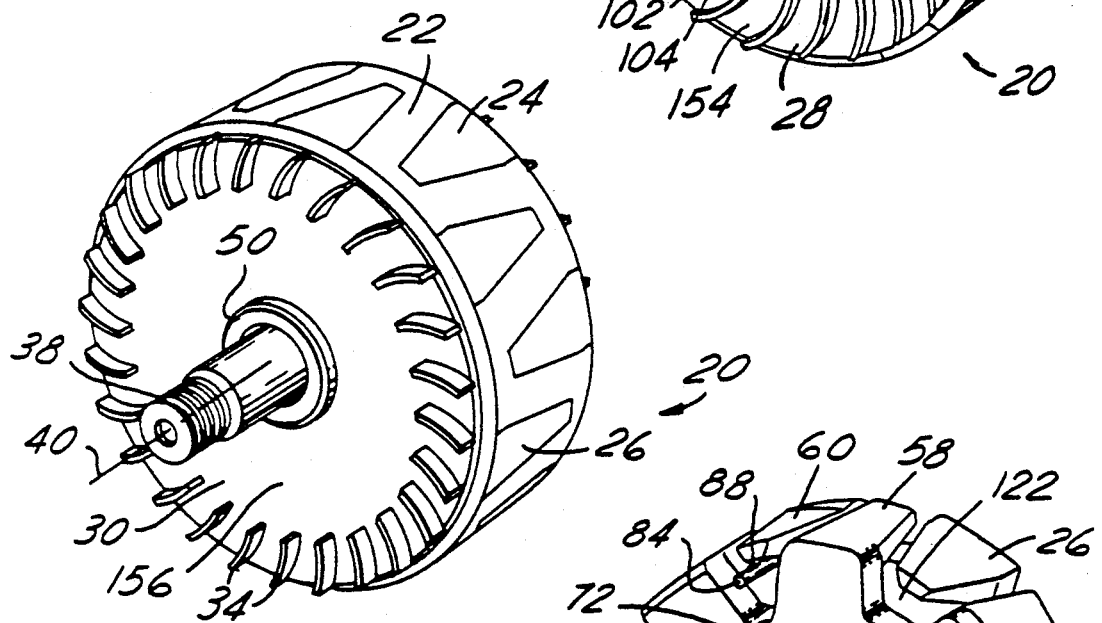
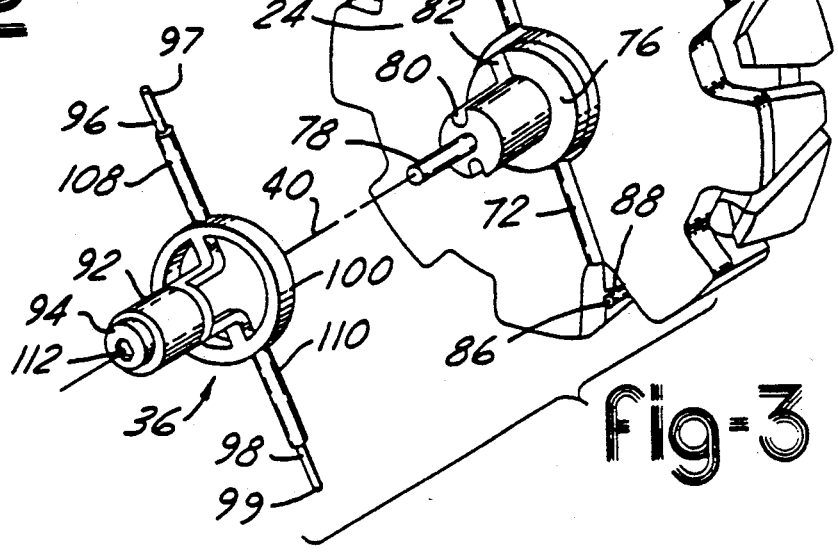

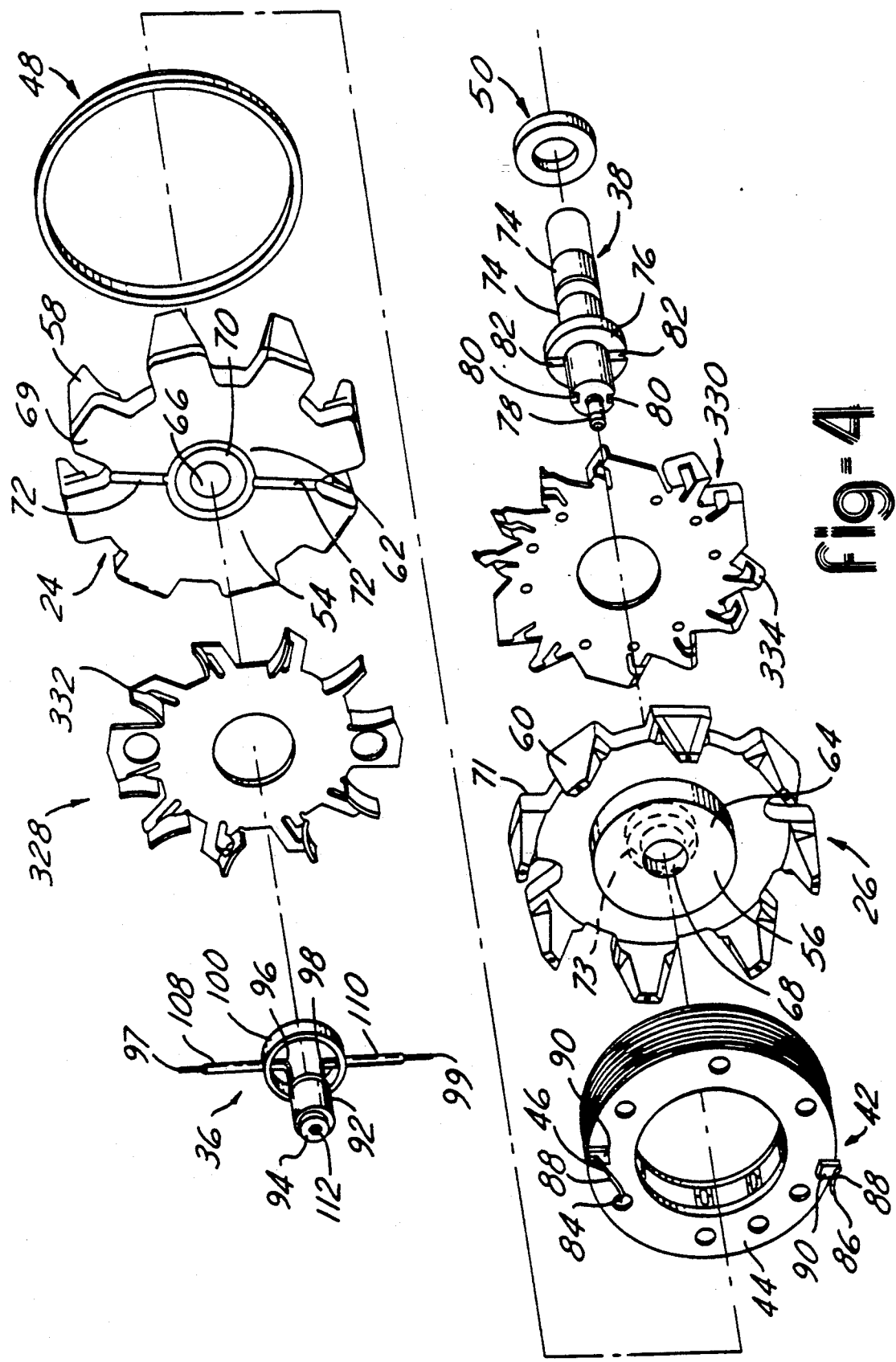

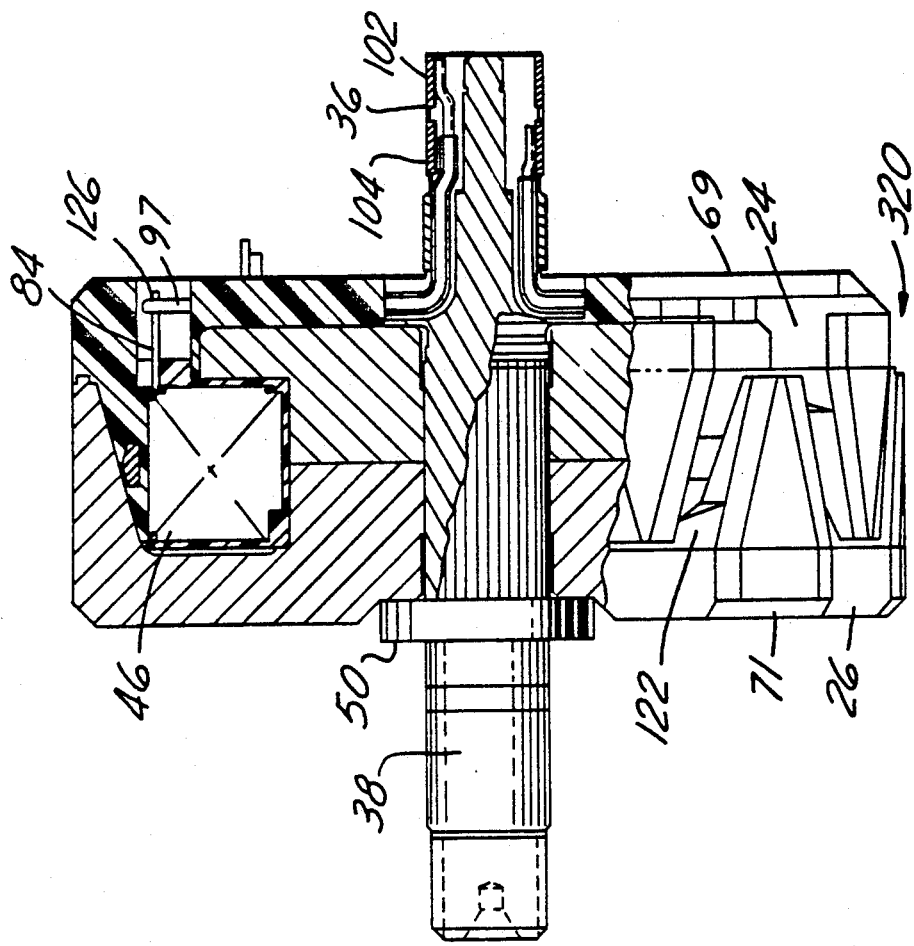
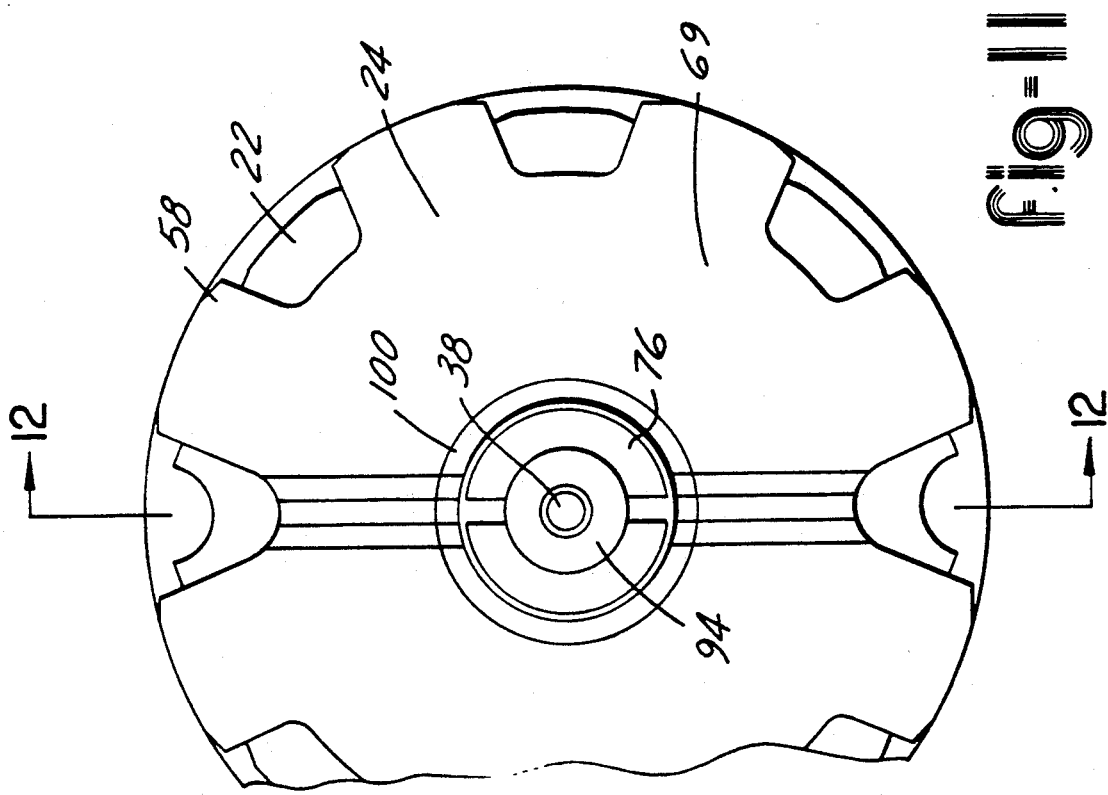

MOLDED ROTOR ASSEMBLY FOR AN ALTERNATOR AND METHOD FOR MAKING THE SAME

TECHNICAL FIELD

This invention relates to rotor assemblies for vehicle alternators of a claw-pole type design.

INCORPORATION BY REFERENCE

The disclosures contained in patent applications entitled, "Rotor Assembly with Molded Fans And Method For Making The Same", U.S. Ser. No. 980,048, and "Automotive Alternator Slip Ring Assembly", U.S. Ser. No. 980,393, which are commonly owned by the Assignee of this application and which are simultaneously filed with this application, are hereby incorporated by reference.

BACKGROUND ART

Rotor assemblies for vehicle alternators are often of a claw-pole type design. These rotor assemblies typically include a pair of annular pole pieces aligned along a longitudinal axis and having bores at their centers. Each of the pole pieces has on its radial periphery a number of axially extending fingers giving that pole piece a claw-like appearance. A coil wire is wound about an annular bobbin forming a bobbin assembly. The bobbin assembly is placed in a region formed between the pole pieces. The pole pieces are mounted on a rotor shaft with the fingers of the respective pole pieces being interleaved with one another. The coil wire, bobbin and pole pieces are coated with a varnish and then baked to hold the coil wires in a fixed position relative to one another.

A slip ring assembly is also mounted on the rotor shaft. The slip ring assembly has a pair of axially spaced slip rings which are adapted to mate with exterior brushes. The slip ring assembly includes a pair of terminals which are connected to respective slip rings. A pair of stamped metal fans is then attached to the axially outboard faces of each pole piece.

The rotor assembly is mounted inside a stator and an alternator housing to form an alternator. When voltage is supplied to the slip ring assembly and the rotor assembly is rotated, the rotor assembly induces the flow of current in the windings of the stator. This current is output from the alternator. Heat generated by current flowing through the coil wire and windings is carried away by air currents, created by the rotation of the fans, through perforations in the alternator housing.

Alternators, constructed as described above, have several shortcomings. First, the high speed rotation of the rotor assembly within the alternator housing creates a significant amount of noise. A portion of this noise is originated by air flowing between the pole pieces and the bobbin assembly during rotor assembly rotation. Likewise, during operation of the alternator, the fingers of the pole pieces may vibrate radially due to forces associated with changing magnetic fields, thereby creating additional noise. An annular support ring, made from a nonmagnetic material, is often placed within the interleaving fingers to provide radial support to the fingers thereby reducing vibration and noise. Also, separate spacer pieces, configured to fit between the interleaving fingers, are sometimes placed between the pieces to reduce air flow disturbance resulting from the nonuniform surface of the rotor.

Second, connections formed between the terminals of the slip ring assembly and the respective ends of the coil wire are subject to failure. The high speed rotation of the rotor assembly, which may be on the order of 18,000–23,000 RPM, subjects the connections to substantial acceleration forces. As these connections are generally isolated from and are not supported by the rest of the rotor assembly, fatigue failures of the connections may occur, with corresponding failure of the entire alternator. Consequently, the alternator must be disassembled, the connections repaired, and the alternator reassembled. Alternatively, the alternator must be completely replaced. In either case, the repair or replacement is expensive and time consuming.

The present invention addresses problems associated with the above-identified shortcomings.

DISCLOSURE OF INVENTION

The present invention includes an integrally molded rotor assembly and method for making the same. The rotor assembly includes a pair of pole pieces, a coil wire, a slip ring assembly, a rotor shaft, and a molded insert integrally molded to the pole pieces.

The pole pieces are annular and are axially aligned along a longitudinal axis to define a region between the pole pieces. Each pole piece has a plurality of axially inboard-extending fingers located along the radial periphery of each pole piece. The fingers on each pole piece are preferably regularly spaced around the periphery and interleaved with the fingers on the other pole piece.

The coil wire is wound in loops or turns and is located in the region between the pole pieces. Preferably, the coil wire is wound about an annular bobbin to form a bobbin assembly. The coil wire includes a pair of free ends.

The slip ring assembly, preferably, includes a pair of slip rings, a central hub and a pair of terminals. The pair of pole pieces and the hub of the slip ring are mounted upon the rotor shaft. Each terminal is attached to a respective free end of the coil wire thereby forming a pair of connections.

The molded insert is integrally molded to at least one of the pole pieces and fills at least partially the region between the pole pieces. Preferably, the molded insert provides radial support to the interleaving fingers of the pole pieces, resulting in reduced vibration in the fingers. The rotor assembly may further include a nonmagnetic annular support ring, encapsulated in the insert, which further radially supports the interleaving fingers.

Ideally, the molded insert completely fills the region between axial outboard faces of the pole pieces such that the pole pieces and the molded insert cooperate to form a smooth cylindrical periphery on the rotor assembly. Air disturbance and noise created by air flowing between the pole pieces and bobbin assembly during rotor assembly rotation are thereby eliminated.

Preferably, the molded insert also encapsulates and provides support for the connections between the free ends of the coil wire and the terminals of the slip ring assembly. This reduces the load and stresses experienced by the connections during rotor assembly rotation thus extending the fatigue life of the connections and increasing the rotational speeds at which the rotor assembly can be operated.

The present invention further comprises a method for making an integrally molded rotor for an alternator. The method includes placing a coil wire, which has a pair of free ends and which preferably is wound about an annular bobbin to form a bobbin assembly, in a region defined between first and second annular pole pieces which are aligned along a longitudinal axis. Each pole piece has a plurality of axially inboard extending fingers which are interleaved, and preferably spaced apart, relative to the fingers of the other pole piece.

A slip ring assembly and the pole pieces are mounted on a rotor shaft. The slip ring assembly includes a pair of slip rings connected to a respective pair of terminals. Each terminal is connected to a respective free end of the coil wire thereby forming a pair of connections.

The above-identified components form a subassembly which is placed in a mold. A molded insert is then integrally molded to the pole pieces which at least partially fills the region between the pole pieces. Ideally, the molded insert completely fills the region between the pole pieces to form a generally smooth cylindrical periphery on the rotor assembly. Preferably, the molded insert encapsulates each of the connections. Further, this method may also include placing a support ring, prior to molding, within the interleaving fingers to provide additional radial support to the fingers. The rotor assembly may then be mounted inside a stator and an alternator housing to form a vehicle alternator.

It is another object to provide a rotor assembly having an integrally molded insert which provides support to interleaving fingers on cooperating pole pieces to reduce vibrations of the fingers and noise created during rotation of the rotor assembly.

It is yet another object to provide a molded insert which encapsulates connections formed between terminals on a slip ring assembly and respective free ends of a coil wire of the rotor assembly such that the connections are fully supported thereby reducing failures at these connections and increasing the rotational speed at which the rotor assembly may be operated.

Another object of the present invention is to provide an integrally molded insert which fills the region between the pair of pole pieces and cooperates with the pole pieces to produce a smooth cylindrical surface on the rotor assembly to reduce the amount of air disturbance and noise generated during the rotation of the rotor assembly.

It is yet a further object to provide a method for making a molded rotor assembly for a vehicle alternator comprising the steps of interleaving and spacing axially inboard extending fingers of a pair of claw-pole pieces to form a region between the pole pieces with a coil wire being held in the region. A pair of slip rings, which are connected to a pair terminals, and the pole pieces are mounted to a rotor shaft. Connections are formed between respective free ends of the coil wire and the respective terminals. A molded insert is then integrally molded to at least one of the pole pieces such that the insert at least partially fills the region between the pole pieces. Preferably, the molded insert encapsulates the connections. Ideally the molded insert and the pole pieces cooperate to form a smooth, cylindrical surface on the rotor assembly.

Other objects, features, and advantages will become more readily apparent from the following description and accompanying sheets of drawings.

BRIEF DESCRIPTION OF THE DRAWINGS

FIG. 1 is a rear perspective view of a molded rotor assembly, including molded fans and a slip ring assembly, made in accordance with the present invention;

FIG. 2 is a front perspective view of the rotor assembly of FIG. 1;

FIG. 3 is an exploded view of a slip ring assembly, pole pieces and a rotor shaft;

FIG. 4 is an exploded view of components included in a rotor assembly which uses stamped metal fans rather than molded fans;

FIG. 11 is a fragmentary rear view of a molded rotor assembly without fans attached;

FIG. 12 is a side view taken generally along line 12—12 of FIG. 11, partially in section and partially in cutaway;

BEST MODE FOR CARRYING OUT THE INVENTION

Figure 5:
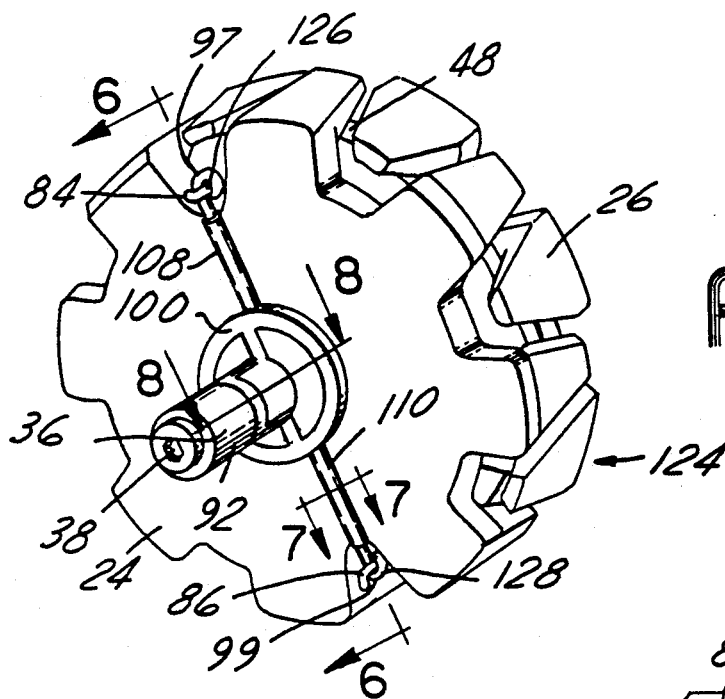
FIG. 5 is a rear perspective view of a rotor subassembly showing connections formed between terminals of the slip ring assembly and free ends of a coil wire.

With reference to the drawings, a molded rotor assembly made in accordance with a preferred first embodiment is generally indicated by the reference numeral 20. As seen in FIGS. 1 and 2, rotor assembly 20 includes a molded insert 22 sandwiched between first and second pole pieces 24 and 26. First and second molded fans 28 and 30 have a plurality of circumaxially spaced blades 32 and 34, respectively, which are integrally molded to first and second pole pieces 24 and 26. Prior to any molding, a slip ring assembly 36, depicted in FIG. 3, as well as first and second pole pieces 24 and 26, are mounted to a rotor shaft 38 which is axially aligned along a longitudinal axis 40 of rotor shaft 38.

FIG. 4 is an exploded view of components included in the rotor assembly 20. Stamped metal fans 328 and 330, used in place of molded fans 28 and 30 in an alternative embodiment of a rotor assembly, are also shown. The rotor assembly 20 comprises first and second pole pieces 24 and 26, slip ring assembly 36, rotor shaft 38, a bobbin assembly 42 including a bobbin 44 which holds a coil wire 46, and a nonmagnetic annular support ring 48. Also shown is a collar 50 which mounts on rotor shaft 38 outboard of pole piece 26.

First and second pole pieces 24 and 26 have respective central annular portions 54 and 56 and a plurality of circumaxially spaced and axially inboard-extending fingers 58 and 60 disposed along their respective radial peripheries. The annular portions 54 and 56 have hubs 62 and 64 with respective bores 66 and 68 therein. On the back or outboard axial face 69 of pole piece 24 are annular recess 70 and a pair of radially extending channels 72 which are sized and configured to receive, in a flush manner, portions of slip ring assembly 36. Pole piece 26 has a front outboard face 71 with an annular recess 73 formed therein which is adapted to receive collar 50. Pole pieces 24 and 26 are preferably made of steel.

Rotor shaft 38, also preferably made of steel, has splined portion 74 onto which bores 66 and 68 of pole pieces 24 and 26 are press fit. An integral collar 76 is formed on rotor shaft 38 to provide a stop against which the slip ring assembly 36 may snugly fit. Rotor shaft 38 also has a reduced diameter end 78. Pairs of respective axial grooves 80 and radial grooves 82 are formed in rotor shaft 38, with radial grooves 82 located within collar 76.

Bobbin assembly 42 includes annular bobbin 44 which is U-shaped in cross-section and is designed to hold turns of coil wire 46. Coil wire 46 is wound about bobbin 44 and has free ends 84 and 86. The turns of coil wire 46 are electrically insulated from one another by insulating coating 88 which is applied to the outside of the coil wire 46 prior to winding coil wire 46 on to bobbin 44. In the preferred embodiment, this insulating coating is armored polythermaleze 2000 (APTZ) which is available, along with coil wire 46, from Phelps Dodge Magnet Wire Company of Fort Wayne, Indiana.

Bobbin 44 preferably is made from a molded plastic and serves to assist in electrically insulating coil wire 46 from pole pieces 24 and 26. Along the radial periphery of bobbin 44 are a pair of forked guides 90 which retain free ends 84 and 86 of coil wire 46 as they leave bobbin 44.

Figure 6:
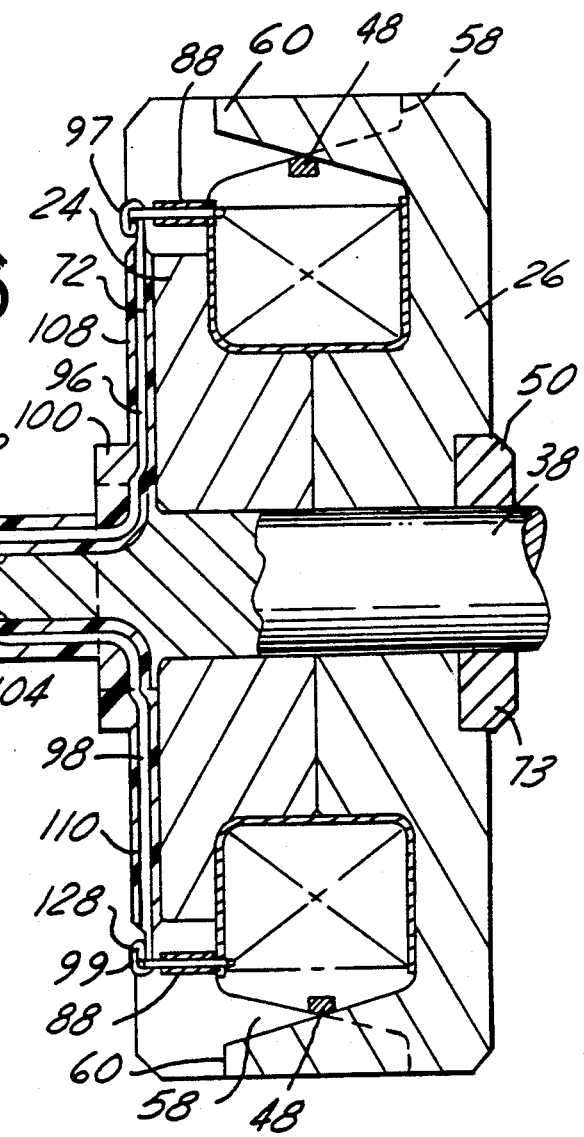
FIG. 6 is sectional view taken along line 6—6 of FIG. 5.

Slip ring assembly 36 comprises an annular metallic band 92, a hub 94, a pair of L-shaped terminals 96 and 98 and a circular mold shutoff ring 100. FIG. 6 shows a cross-sectional view of slip ring assembly 36 mounting on rotor shaft 38 and against pole piece 24. Metallic band 92 is preferably copper and has a pair of axially spaced slip rings 102 and 104 connected together by a reduced thickness bridge portion 106. After slip ring assembly 36 has been mounted on rotor shaft 38, the outer radial portion of band 92 is machined away to remove bridge portion 106 and thereby separate slip rings 102 and 104 from one another, as seen in FIG. 1.

Terminals 96 and 98 are metallic, preferably copper, and are surrounded by insulating coverings 108 and 110, except at respective exposed ends 97 and 99. Hub 94 has a bore 112 therein adapted to fit over reduced diameter end 78 of rotor shaft 38 in a press-fit manner. Hub 94 serves to support and insulate slip rings 102 and 104 from each other and from rotor shaft 38.

Figure 8:
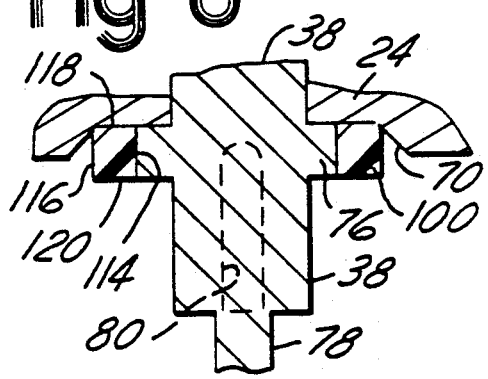
FIG. 8 is a fragmentary sectional view taken along line 8—8 of FIG. 5.

Mold shutoff ring 100 supports and provides structural rigidity to terminals 96 and 98. Terminals 96 and 98 pass through the axial length of mold shutoff ring 100. As best seen in FIG. 8, mold shutoff ring 100 has an inner radial surface 114, an outer radial surface 116, and planar inboard and outboard axial surfaces 118 and 120. Inboard axial surface 118 mates flushly against annular recess 70 in outboard face 69 of pole piece 24 as does collar 76 of rotor shaft 38. Inner radial surface 114 is flushly mounted over the outer diameter of collar 76 of shaft 38.

Slip ring assembly 36 is constructed by soldering or welding first ends of terminals 96 and 98 to respective slip rings 104 and 102, as seen in FIG. 6. Terminal 98 is configured to bypass slip ring 104. Terminals 96 and 98 and slip rings 102 and 104 are then placed within an appropriately configured mold. The mold is filled with a molten plastic material to form hub 94, mold shutoff ring 100 and insulating coverings 108 and 110 of slip ring assembly 36. The preferred plastic material to be used in the construction of slip ring assembly 36 is a glass-filled polyphenylene sulfide sold under the trade name Ryton ® by the Phillips 66 Company. Those skilled in the art will realize that alternative materials may also be used to mold slip ring assembly 36.

Annular or circular support ring 48 has an outer diametrical periphery which is slightly larger than the inner diameters of interleaved first and second fingers 58 and 60 of respective pole pieces 24 and 26. Support ring 48 is made of a nonmagnetic material such as aluminum. The support provided to fingers 58 and 60 by the support ring 48 reduces vibration during rotation of rotor assembly 20.

Looking back now to the exploded view of FIG. 3, pole pieces 24 and 26 are mounted upon rotor shaft 38 and are axially aligned along longitudinal axis 40. Fingers 58 and 60 of pole pieces 24 and 26 are interleaved and spaced apart with respect to one another. A region 122 is defined between pole pieces 24 and 26. Free ends 84 and 86 of coil wire 46 are shown extending axially outboard from region 122.

Figure 7:
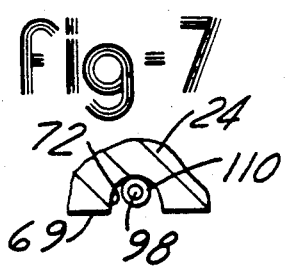
FIG. 7 is a fragmentary sectional view taken along line 7—7 of FIG. 5.

Slip ring assembly 36 is also mounted on rotor shaft 38. Bore 112 of slip ring assembly 36 fits over reduced diameter end 78 in a press-fit manner. Axially extending portions of terminals 96 and 98 are received in axial grooves 80 of rotor shaft 38. Likewise, radially outward extending portions of terminals 96 and 98, located radially within mold shutoff ring 100, are received in radial grooves 82 of collar 76. The portions of terminals 96 and 98 and of the portions of coverings 108 and 11 located radially outside mold shutoff ring 100 are received within radially extending channels 72 located in outboard face 69 of pole piece 24. Radially extending recesses 72 are deep enough to receive terminals 96 and 98 and their coverings 108 and 110 beneath the planar surface of axial outboard face 69 of pole piece 24, as shown in FIG. 7.

Referring again to FIG. 8, inboard axial surface 118 of mold shutoff ring 100 is nested flush within annular recess 70 of pole piece 24. Likewise, collar 76 of rotor shaft 38 also rests flush in annular recess 70. Inner radial surface 114 of mold shutoff ring 100 fits snugly over and receives radial support from the cylindrical surface of collar 76.

FIG. 5 shows a subassembly 124 including pole pieces 24 and 26, slip ring assembly 36, rotor shaft 38, bobbin assembly 42, and support ring 48 after these components have been assembled together. A pair of connections 126 and 128 is formed between respective free ends 84 and 86 of coil wire 46 and exposed ends 97 and 99 of terminals 96 and 98.

To form connections 126 and 128, exposed ends 97 and 99 of terminals 96 and 98 are first bent into a hook shape. Free ends 84 and 86 are then placed within the exposed ends 97 and 99 and an apparatus, not shown, crimps and heats ends 84 and 86 and exposed ends 97 and 99. In this operation, insulating coating 88 on each of ends 84 and 86 is melted away leaving respective welded connections 126 and 128 which are electrically connected, as shown in FIG. 6.

Figure 9:
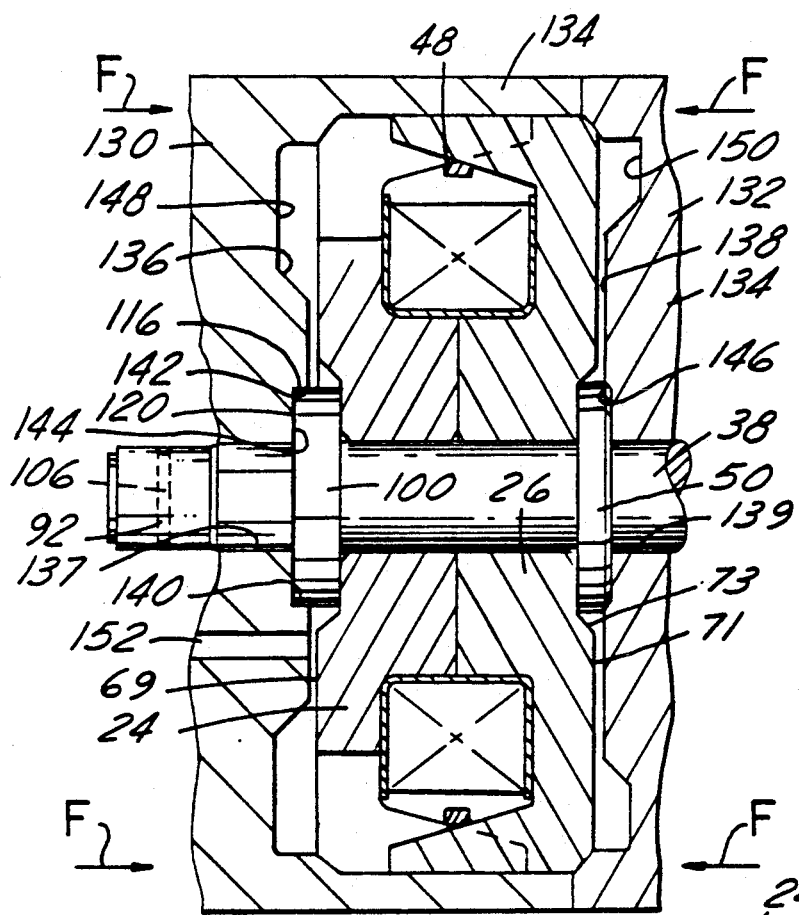
FIG. 9 is a partial sectional view of the rotor subassembly of FIG. 5 located within a mold.

Turning now to FIG. 9, rotor subassembly 124 is placed between a pair of mold halves 130 and 132 of a mold 134. Mold halves 130 and 132 have respective inner surfaces 136 and 138 which mate against mold shutoff ring 100 and collar 50 and the outer radial periphery of pole pieces 24 and 26. Inner surface 136 has a cup-shaped recess 140 including a radial mating surface 142 and an outboard mating surface 144 which mate, respectively, with outer radial surface 116 and outboard surface 120 of mold shutoff ring 100. The mating of mold shutoff ring 100 between recess 70 on pole piece 24 and recess 140 of mold half 130 serves as a mold shutoff to prevent mold material from flowing onto rotor shaft 38 and band 92 during molding. Similarly, a cup-shaped annular recess 146 mates against the outboard and outer radial surfaces of collar 50 to provide a mold shutoff to prevent mold material from reaching rotor shaft 38 adjacent pole piece 26.

Rotor apertures 137 and 139 are formed in respective inner surfaces 136 and 138 of mold 134 to accommodate rotor shaft 38. Sprue 152 is provided in mold half 130 to introduce mold material into mold 134. Blade recesses 148 and 150 are also contoured into respective inner surfaces 136 and 138 to form blades 32 and 34 of molded fans 28 and 30 during molding.

In operation, mold halves 130 and 132 are pressed against pole pieces 24 and 26 of rotor subassembly 124. Recesses 140 and 146 mate against mold shutoff ring 100 and collar 50 to prevent mold material from reaching rotor shaft 38 and band 92 during the molding operation. As mold shutoff ring 100 is radially supported by collar 76 on rotor shaft 38 and axially supported against recess 70, large compressive forces can be applied across mold half 130, mold shutoff ring 100 and pole piece 24 to ensure proper mold shutoff without damaging mold shutoff ring 100. Similarly, a counterbalancing compressive force can be applied across mold half 132, collar 50 and pole piece 26. As mold material is injected at high temperatures and under high pressure, a large rather than small compressive load holding mold 134 about rotor assembly 124 is preferred.

Prior to molding, subassembly 124 is preheated. The mold material forming molded fans 28 and 30 and molded insert 122 is Ryton TM, the same material as is used to make slip ring assembly 36. The mold material is heated to a molten state of approximately 316° C.

Mold material is then injection molded at high pressures through sprue 152 into the open spaces between mold 134 and pole pieces 24 and 26 to form molded rotor assembly 20. The mold material travels radially outwardly forming fan 28 having blades 32. The mold material then passe through the circumaxially spaced gaps in outboard face 69 formed between fingers 58 and fills region 122 located between pole pieces 24 and 26 to form molded insert 22. Finally the mold material passes through circumaxially spaced gaps in outboard face 71 between fingers 60, to form fan 30 having blades 34.

The molten mold material cools and solidifies before melting either coverings 108 and 110 or mold shutoff ring 100 of slip ring assembly 36. The armored polythermaleze 2000 coating 88 on coil wire 40 has a flow temperature of between 325°-350° C. Therefore, no flow or disruption of coating 88 on coil wire 46 occurs during molding. Consequently, coil wire 46 and terminals 96 and 98 remain electrically insulated from pole pieces 24 and 2 after the molding operation has been completed.

The resulting molded rotor assembly 20 is shown in FIGS. 1 and 2. The outboard axial faces 69 and 71 of pole pieces 24 and 26 include thin coverings 154 and 156 of molded material. Coverings 154 and 156 and the blades 32 and 34 combine to form fans 28 and 30. Connections 126 and 128, as well as support ring 48 and bobbin assembly 42, are encapsulated by molded insert 22. Molded insert 22 fills region 122 between pole pieces 24 and 26 and is integral to fans 32 and 34, thereby retaining fans 32 and 34 to pole pieces 24 and 26.

The radially outer periphery of molded rotor 20, if not sufficiently smooth, is then machined. This produces a smooth cylindrical periphery with radially outer surfaces on the fingers 58 and 60 being exposed. Band 92 of slip ring assembly 36 is machined to produce a clean conductive surface and to electrically separate slip rings 102 and 104 from one another.

The smooth outer cylindrical periphery of molded rotor assembly 20 produces less air disturbance than a similar rotor without a smooth periphery. Also, less noise is generated by vibrating fingers 58 and 60 on pole pieces 24 and 26, which are supported by molded insert 22, as compared to a rotor assembly wherein the fingers are not supported.

Rotor assembly 20 is then balanced. Appropriate portions of material are removed from pole pieces 24 and 26 in a standard balancing procedure. Alternatively, material could be added to rotor assembly for the purpose of balancing. With molded insert 22 and molded fans 32 and 34 being accurately molded to pole pieces 24 and 26, rotor assembly 20 has been found to be better balanced and require less rework to achieve a balance condition than a corresponding rotor assembly which has metal fans welded to pole pieces.

Figure 14:
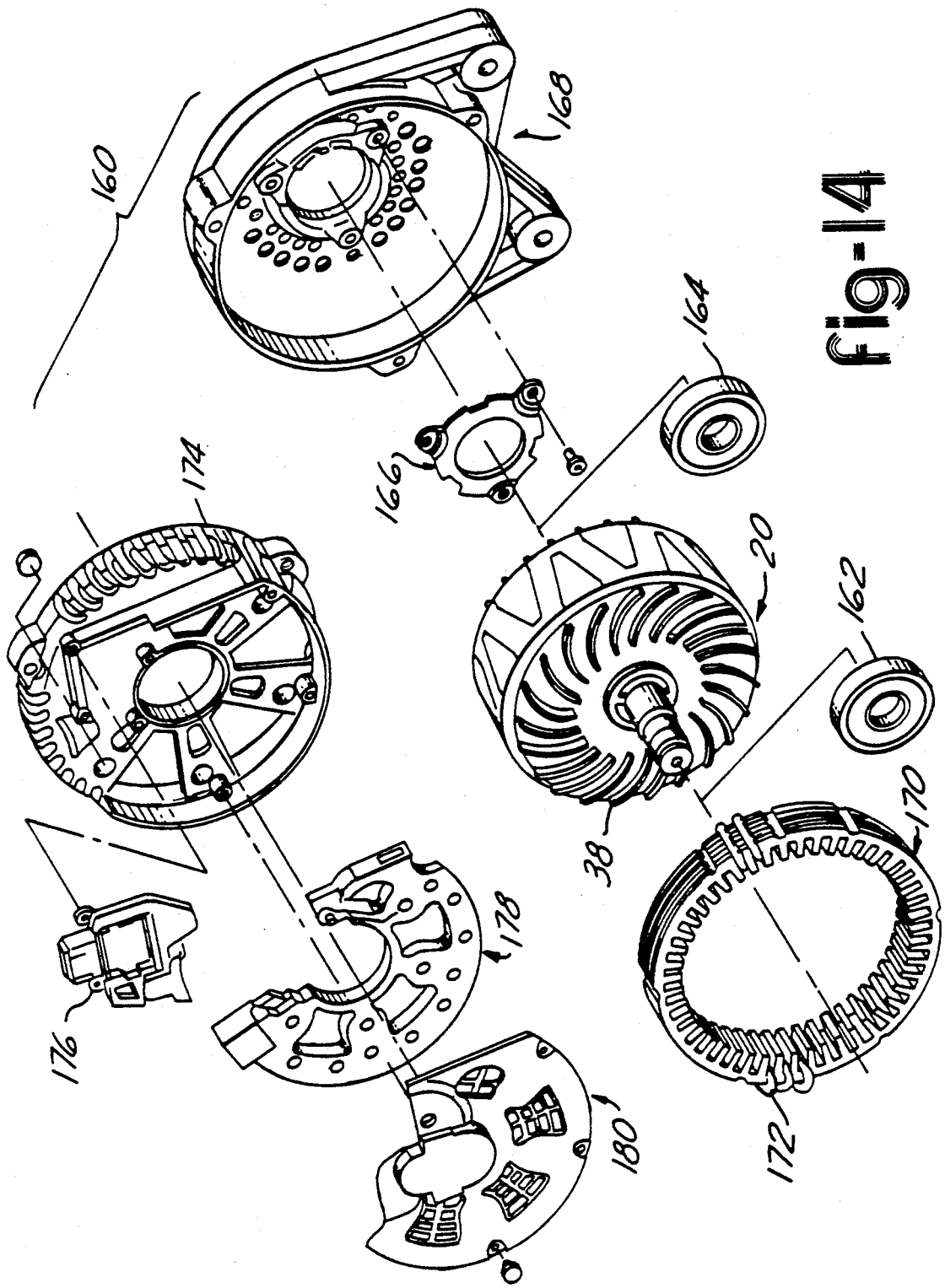
FIG. 14 is an exploded perspective view of an alternator incorporating the improved molded rotor assembly.

FIG. 14 demonstrates how rotor assembly 20 is combined with other components to form a vehicle alternator 160. Bearings 162 and 164 are mounted on either side of molded rotor assembly 20 on rotor shaft 38. Bearing 164 is supported by a retainer 166 which is bolted to a front housing piece 168. A stator 170 with windings 172, is placed radially about rotor assembly 20. A back housing piece 174 is joined to front housing piece 168 to support stator 170 and bearings 162 and 164. A brush holder and regulator 176, rectifier 178 and cover 180 are also included in vehicle alternator 160.

Method steps used in constructing rotor assembly 20 are as follows. First, coil wire 46, having coating 88 thereon, is wound about bobbin 44 to form the bobbin assembly 42. First and second pole pieces 24 and 26 are then placed together on rotor shaft 38 capturing the bobbin assembly 44 in the region 122. Hubs 46 and 48 are placed to abut one another such that the axially extending fingers 58 and 60 are interleaved and spaced apart relative to one another. Slip ring assembly 36 is then press fit onto rotor shaft 38 with mold shutoff ring 100 being flush against recess 70 of pole piece 24 and rotor shaft 38. Connections 126 and 128 are made between each of free ends 84 and 86 of coil wire 46 and the respective exposed ends 97 and 99 of terminals 96 and 98 of slip ring assembly 36. Finally, rotor subassembly 124 is compressively held in place between mold halves 130 and 132 of a mold assembly 134 with mold shutoff ring 100 sealing rotor shaft 38 and slip rings 102 and 104 from mold 134.

Mold material is then injunction molded into the mold 134 forming molded insert 22 which is molded integrally to pole pieces 24 and 26 and fills region 122 between pole pieces 24 and 26. Also, fans 28 and 30 are formed. Molded insert 22 partially encapsulates fingers 58 and 60 thereby providing radial support to fingers 58 and 60. Further, a smooth cylindrical surface on the rotor assembly 20 is formed. Optionally, the method includes placing a support ring 48 within fingers 58 and 60 prior to the molding step.

Figure 10:
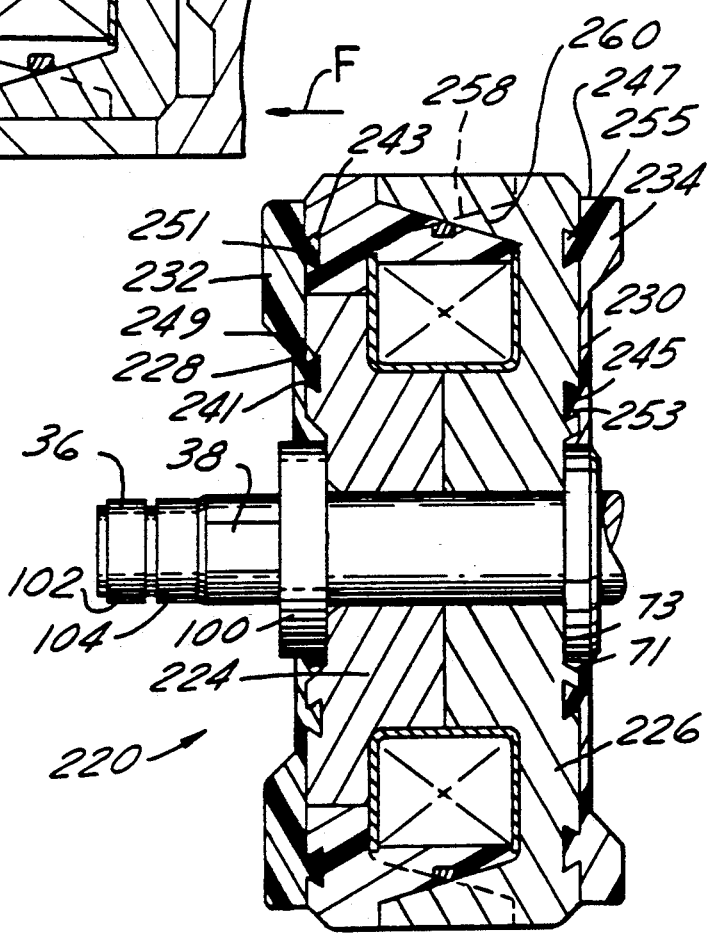
FIG. 10 is a sectional view of an alternative embodiment of a molded rotor assembly with molded fans but absent the molded insert.

A second embodiment of a rotor assembly 220 is shown in FIG. 10 and is similar to rotor assembly 20 described above, however, no molded insert is created. Rotor assembly 220 has pole pieces 224 and 226 with molded fans 228 and 230 being molded thereon. Fans 228 and 230 include respective fan blades 232 and 234. Slip ring assembly 36 mounts on rotor shaft 38 with mold shutoff ring 100 again serving as a shutoff providing a radial seal between a mold assembly (not shown) and rotor shaft 38 during injection molding of fans 228 and 230.

Radially inner and outer anchor recesses 241 and 243 are provided on the outboard axial face of pole pieces 224. Similarly, radially inner and outer anchor recesses 245 and 247 are formed in pole pieces 226. Preferably, the anchor recesses 241, 243, 245 and 247 are dovetailed in cross-section. Radially inner anchor recesses 241 and 245 may extend continuously circumferentially or else be circumaxially spaced. Anchor recesses 243 and 247 are circumaxially spaced on the outboard axial faces adjacent fingers 258 and 260.

The mold assembly used to form fans 228 and 230 seals against the outboard axial faces of pole pieces 224 and 226. This prevents leaking of mold material between the circumaxially spaced gaps formed between fingers 258 and 260 and into the region formed between pole pieces 224 and 226 during molding. Fans 228 and 230 have respective anchors 249 and 251 and 253 and 255 which are cooperatively held within respective anchoring recesses 241, 243, 245 and 247. This anchoring prevents fans 228 and 230 from separating from pole pieces 224 and 226 and eliminates the need to have a molded insert between pole pieces 224 and 226.

Figure 13:
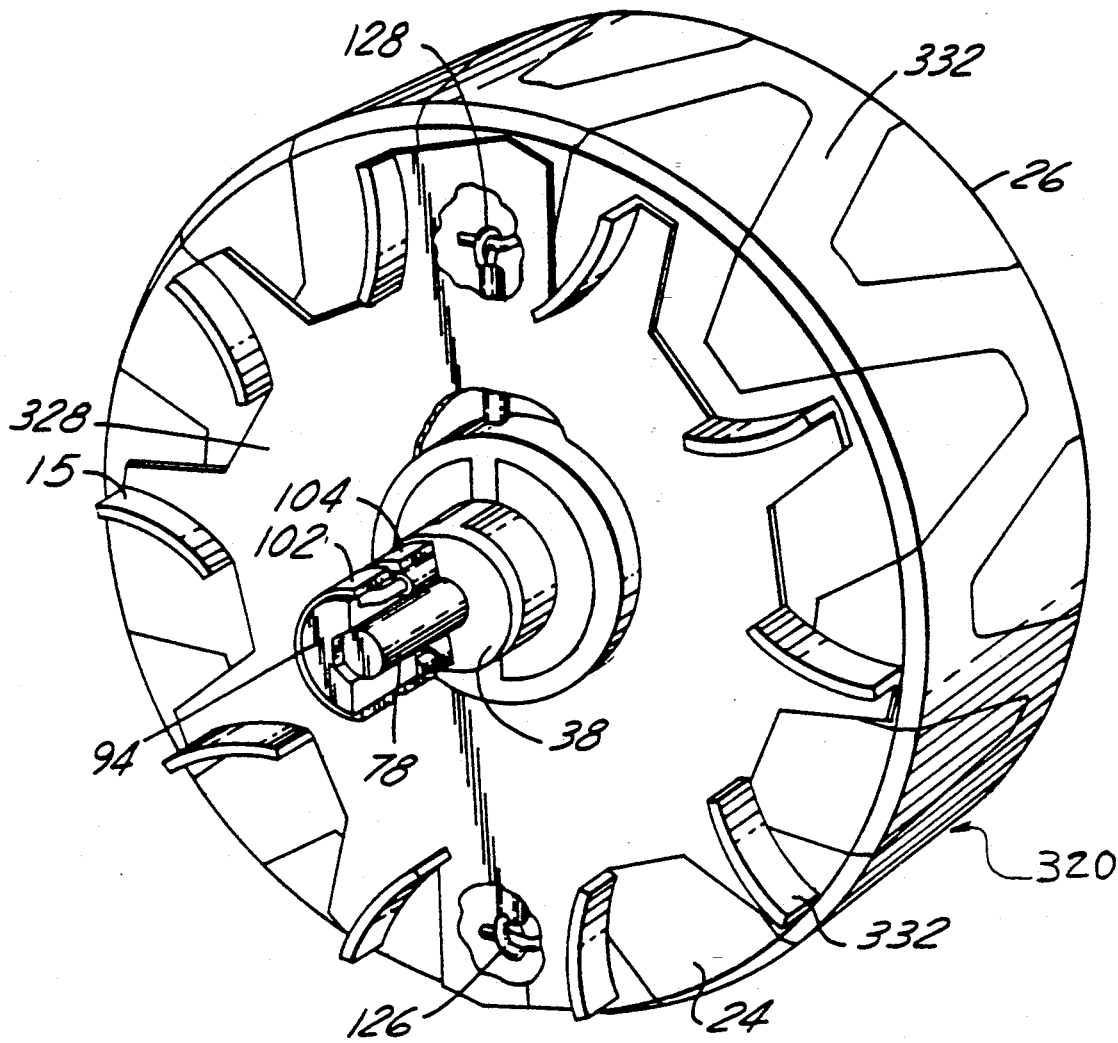
FIG. 13 is a perspective view, partially in cutaway, of the rotor assembly of FIG. 12 with stamped metal fans attached.

A third embodiment of a rotor assembly 320, also similar in construction to that of rotor assembly 20, is shown in FIG. 13. Rotor assembly 320 has a molded insert 322 formed between pole pieces 24 and 26. However, rather than using molded fans, rotor assembly 320 uses stamped metal fans 328 and 330, which are shown in FIG. 4.

FIGS. 11 and 12 show pole pieces 24 and 26 prior to attachment of fans 328 and 330. Axially outboard faces 69 and 71 of pole pieces 24 and 26 remain free of mold material, with the exception of radially extending channels 72 which are again filled with mold material during the molding operation.

Connection 126, shown cutaway in FIG. 13, and connection 128, not shown, are again encapsulated in mold material. A lower portion of molded rotor assembly 320 in FIG. 12 is shown without mold material to illustrate the space available in region 122 between pole pieces 24 and 26. Without molded insert 322, air passing through region 122 would cause noise during the rotation of rotor assembly 320.

The mold used to form molded rotor assembly 320, not shown, mates flushly against the outboard axial faces 69 and 71 of pole pieces 24 and 26 to keep these faces free of mold material, except for the axially extending channels 72 which are filled with mold material in the molding step.

Stamped metal fans 328 and 330, having respective axially outboard extending fan blades 332 and 334, as shown in FIGS. 4 and 13, are welded to outboard axial faces 69 and 71 of pole pieces 24 and 26.

As described above, the use of molded insert 22, molded fans 28 and 30 and slip ring assembly 36 in molded rotor assembly 20 has advantages over prior art rotor assemblies.

Molded insert 22 fills the region 122 eliminating any empty air space located between the pole pieces 24 and 26. The exterior cylindrical surface of the rotor assembly 20 may be made smooth. Therefore, there is significantly less air disturbance in the region between pole pieces 24 and 26 in the present design than in a rotor assembly design having no molded insert 22. Accordingly, noise produced by the rotating rotor assembly 20 is less than the noise of rotor assemblies of a conventional design.

A second advantage is that the molded insert 22 provides radial and circumferential support to the fingers 58 and 60 of the pole pieces 24 and 26, respectively. The molded insert 22 provides sufficient support such that the support ring 48 may be eliminated. However, the combination of the support ring 48 and molded insert 22 provides more support, and consequently allows less vibration by the fingers 58 and 60, than is allowed by using molded insert 22 alone. Molded insert 22 also appears to serve a noise dampening function due to its material characteristics.

A third advantage of using the molded insert 22 is that connections 126 and 128 are completely encapsulated and supported. This support reduces the loads and corresponding stresses carried by the connections 126 and 128 during alternator operation, and therefore, extends the fatigue life of connections 126 and 128. Accordingly, the operational lives of the rotor assembly 20, and its corresponding alternator 160, are extended.

Use of molded fans 28 and 30 in rotor assembly 20 obviates the need to affix fans to pole pieces 24 and 26. Additionally, configurations of blade shapes which are not possible with stamped metal fans are available with molded fans. Further, molded fans 28 and 30 can be accurately incorporated into rotor assembly 20 to provide a rotor assembly which is relatively well balanced and requires less rework to achieve a proper balance than do conventional rotor assemblies using stamped metal fans.

Mold shutoff ring 100 provides significant structural support and rigidity to terminals 9 and 98. Further, mold shutoff ring 100 provides a ready mold shutoff mechanism when captured between a mold and a pole piece to prevent molten mold material from overflowing onto a rotor shaft and associated slip rings. The mating of mold shutoff ring 1 between pole piece 24 and mold half 132 allows substantial compressive forces to be applied across rotor subassembly 124 without damaging mold shutoff ring 100 or adversely affecting its sealing function.

While this invention has been described in the foregoing specification in relation to certain preferred embodiments thereof, and many details have been set forth for the purposes of illustration, it will be apparent to those skilled in the art that the invention is susceptible to additional embodiments and that certain details described herein can be varied considerably without departing from the basic principles of the invention.

We claim:

1. A molded rotor assembly for a vehicle alternator, the rotor assembly comprising:
    an elongated rotor shaft having a longitudinal axis;
    first and second annular pole pieces axially aligned along and mounted spaced from each other on the rotor shaft defining a region between the pole pieces, each pole piece having along its radial periphery a plurality of circumaxially spaced and axially inboard-extending fingers, the fingers on each pole piece interleaving with the fingers on the other pole piece;

a coil wire cooperatively held in the region between the pole pieces, the coil wire having a plurality of turns and a pair of free ends;

a pair of slip rings mounted to the rotor shaft and electrically connected to a respective pair of terminals, each terminal attaching to a respective free end of the coil wire to form a pair of connections; and a molded insert integrally molded to at least one of the pole pieces and at least partially filling the region between the pole pieces and encapsulating turns of the coil wire to prevent relative movement between the turns.

2. The rotor assembly of claim 1 wherein:
the molded insert is integerally molded to and provides radial support to at least one of the fingers.

3. The rotor assembly of claim 2 wherein:
the molded insert fills the region between the pole pieces such that the pole pieces and the molded insert form a generally smooth cylindrical periphery on the rotor assembly.

4. The rotor assembly of claim 3 wherein:
the molded insert encapsulates and supports at least one of the connections thereby reducing stresses experienced by that connection due to the rotation of the rotor assembly.

5. The rotor assembly of claim 1 wherein:
the molded insert encapsulates and supports at least one of the connections thereby reducing stresses experienced by that connection due to the rotation of the rotor assembly.

6. The rotor assembly of claim 1 wherein:
the coil wire has an insulating coating thereon, the coating having a sufficiently high flow temperature to prevent flow of the coating during molding of the molded insert about the coil wire.

7. The rotor assembly of claim 1 wherein:
the molded insert is made from a glass-filled polyphenylene sulfide.

8. The rotor assembly of claim 1 further comprising:
a nonmagnetic annular support ring which is located within the region between the pole pieces and which radially supports the interleaving fingers.

9. An alternator for a vehicle comprising:
a housing;
a stator having windings and being supported by the housing; and
a rotor assembly cooperating with and rotatable relative to the stator and the housing, the rotor assembly including an elongate rotor shaft, a pair of annular pole pieces axially aligned along and mounted on the rotor shaft with a region being defined between the pole pieces, a coil wire held within the region and having a plurality of turns and a pair of free ends, a pair of slip rings mounted on the rotor shaft, which are electrically connected to a respective pair of terminals, which in turn, are attached to the respective free ends of the coil wire to form a pair of respective connections, and a molded insert integrally molded to at least one of the pole pieces and at least partially filling the region between the pole pieces and encapsulating the coil wire to prevent relative movement between the coil wires.

10. The alternator of claim 9 wherein:
the molded insert encapsulates at least one of the connections formed between the terminals and the free ends of the coil wire.

11. The alternator of claim 9 wherein:
each pole piece has circumaxially spaced and axially inboard extending fingers along its outer radial periphery, the fingers on each pole piece interleaving with the fingers on the other pole piece, and the molded insert being integrally molded to and radially supporting at least one of the interleaving fingers.

12. The alternator of claim 11 wherein:
the molded insert fills the region between the pole pieces such that the pole pieces and the molded insert form a generally smooth cylindrical periphery on the rotor assembly.

13. The alternator of claim 12 wherein:
the molded insert encapsulates at least one of the connections formed between the terminals and the free ends of the coil wire.

14. The alternator of claim 9 wherein:
the molded insert is made from a glass-filled polyphenylene sulfide.

15. The rotor assembly of claim 9 wherein:
the coil wire has an insulating coating thereon made from a material which will not flow when the molded insert is molded into the region between the pole pieces and about the coil wire.

16. A molded rotor assembly for a vehicle alternator, the rotor assembly comprising:
an elongated rotor shaft having a longitudinal axis;
first and second annular pole pieces axially aligned along and mounted spaced from each other on the rotor shaft defining a region between the pole pieces, each pole piece having an outboard axial face and along its radial periphery a plurality of circumaxially spaced and axially inboard-extending fingers, the fingers on each pole piece interleaving with the fingers on the other pole piece;
a coil wire cooperatively held in the region between the pole pieces, the coil wire having a pair of free ends;
a slip ring assembly having a pair of slip rings and a pair of terminals, each terminal connecting to a respective slip ring and to a respective free end of the coil wire to form a connection; and
a molded body integrally molded to at least one of the pole pieces and encapsulating at least one connection.

17. The molded rotor assembly of claim 16 wherein:
at least one of the terminals is encapsulated in the molded body against an outboard axial face.

18. The molded rotor of claim 16 wherein:
the slip ring assembly further includes a mold shut-off ring surrounding the rotor shaft and supporting the terminals, a first portion of the mold shut-off ring being captured within the molded body and a second portion being free of the molded body.

19. The molded rotor of claim 18 wherein:
the mold shut-off ring has an inboard face adjacent a pole piece and an outboard face spaced axially distal from the pole piece, the outboard face of the mold shut-off ring being free of the molded body.

* * * * *